3,514,417
ETHYLENE - PROPYLENE INTERPOLYMER RUBBER COMPOSITION COMPRISING A TACKIFIER MIXTURE CONTAINING POLYBUTENE AS ONE COMPOUND AND THE PREPARATION OF TIRES FROM SAID RUBBER COMPOSITION

Frederic W. Bickel, Burbank, and Thomas B. Squire, Santa Monica, Calif., assignors to McDonnell Douglas Corporation, Santa Monica, Calif., a corporation of Maryland No Drawing. Continuation-in-part of application Ser. No. 196,558, Apr. 16, 1962. This application Oct. 26, 1964, Ser. No. 406,594

Int. Cl. C08d 9/08, 9/12; B60c 7/26

U.S. Cl. 260—27                                    18 Claims

This application is a continuation-in-part of our copending application Ser. No. 196,558, filed Apr. 16, 1962, now abandoned.

The instant invention relates to an ethylene-propylene rubber composition, including an ethylene-propylene copolymer rubber component or an ethylene-propylene terpolymer rubber component, having enhanced tackiness, and is particularly concerned with ethylene-propylene rubber compositions, especially those including an ethylene-propylene terpolymer, having incorporated therein a tackifier composed of a combination of materials, one of which is a polybutene, and to a novel tackifier composition.

Typically, ethylene-propylene rubber can be manufactured by copolymerization of ethylene and propylene, by leading ethylene and propylene gases into normal hexane in which the necessary catalysts are in solution. A typical catalyst system can contain vanadium oxychloride and triethyl aluminum chloride, the proportions of which may be varied to produce polymers of various molecular sterospecificites. The copolymerization is carried out in the absence of any moisture. Atmospheric or moderately elevated pressures and normal room temperature are suitable. During the course of copolymerization, the system becomes thick and viscous. The thick, viscous reaction mixture is washed with water to remove the catalyst and the solvent is removed by flashing.

More recently ethylene-propylene terpolymer rubbers have been developed which are produced by polymerization of ethylene, propylene and a small amount of a third monomer. Such third monomer is generally a diene, and can be a conjugated or non-conjugated straight chain diene, or a non-conjugated cyclic diene. Examples of such straight chain conjugated dienes are 1,3-butadiene and isoprene, and examples of the non-conjugated dienes are dicyclopentadiene, 2-methylenenorbornene, 11-ethyl-1,11-tridecadiene, 2-methylnorbornadiene, and 2-(2'-ethyl-2'-butenyl)norbornene. The ethylene-propylene-diene terpolymer can be obtained, for example, by introducing the diene, e.g., 11-ethyl-1,11-tridecadiene, into a solvent such as tetrachloroethylene, and then introducing ethylene and propylene gases into the solution containing catalyst, for example, a combination of aluminum triisobutyl and vanadium oxychloride. The precipitated polymer is washed with methanol and acetone, and is then dried. In such terpolymer rubbers the mole percent of the diene component is substantially less than the mole percent of either ethylene or propylene.

Typical ethylene-propylene copolymer or terpolymer rubbers can contain, for example, about 40 to about 60 mole percent ethylene and about 60 to about 40 mole percent propylene. In a typical ethylene-propylene terpolymer rubber, about 0.1 to about 1.0 mole of diene monomer per kilogram of copolymer, can be employed. The molecular weight for the ethylene-propylene copolymer or terpolymer can range from about 100,000 to about 1,000,000, with the average molecular weight of such polymers in the range of about 250,000 to about 400,000.

As in the case of the ethylene-propylene copolymer rubbers, the terpolymers are also relatively inexpensive rubbers. Both the copolymer and terpolymer rubbers have excellent physical properties which render them highly useful for industrial purposes. For example, these polymers have excellent high temperature resistance, abrasion resistance, ozone and oxygen resistance, weathering and age resistance, and resilience, and have low hysteresis loss. In general, these rubbers have a combination of properties making them exceedingly useful in making automobile tires, except for the fact that they lack the degree of tackiness which is required in the process of manufacturing tires.

In the manufacture of tires, in accordance with conventional procedure, strips of rubber covered cord are applied in laminar fashion to a form to produce the carcass, and in so doing it is important that each layer be securely bonded to each adjoining layer without inclusion of air bubbles or pockets. In the next step in the manufacture of tires, a breaker strip is applied to the previously formed carcass. At this step, it is also important that a secure bonding be achieved with no air pockets. Finally, the sidewall and tread are applied and it is again important that a secure bonding be achieved with no air pockets. In each of these stages uncured rubber compound is employed, and to achieve good bonding and to eliminate air pockets, it has been recognized that the uncured rubber compound should be a tacky rubber compound which if not tacky will not bond well to adjoining layers and will leave air pockets. The term "tack" or "tackiness" is understood to mean the characteristic of rubber which causes two fresh surfaces thereof to adhere or coalesce. This property is of critical importance in the manufacture of tires.

Ethylene-propylene rubbers, including both the copolymers and terpolymers described above, as provided heretofore, have lacked tackiness and therefore have not been adapted previously to the manufacture of tires. By the term "ethylene-propylene rubber" or "ethylene-propylene rubbers" is meant both ethylene-propylene copolymer rubbers and ethylene-propylene-diene terpolymer rubbers as described above.

According to the invention described and claimed in our copending application, ethylene-propylene rubber is provided with desirable tackiness by incorporating therein a polybutene.

It is an object of the present invention to provide an ethylene-propylene rubber having yet improved tackiness characteristics.

A further object of this invention is to impart tackiness to uncured ethylene-propylene rubbers including copolymers thereof and also terpolymers.

A still further object of the invention is to impart to uncured ethylene-propylene rubbers a desirable tackiness without appreciably adversely effecting other properties of the rubber.

Still another object is the provision of improved tackiness to uncured ethylene-propylene rubbers, particularly ethylene-propylene-diene terpolymer rubber, incorporating therein a tackifier composition formed of a plurality of materials including a polybutene.

A still further object of the invention is the provision of a novel tackifier composition for an ethylene-propylene rubber.

Still another object is to provide procedure for fabrication of a rubber article, particularly a tire, formed of two layers of materials containing therebetween uncured ethylene-propylene rubber so that such layers of material have improved adhesion to each other.

Other objects and advantages of the invention will appear hereinafter.

The above objects and advantages are achieved according to the invention by incorporating in an ethylene-propylene rubber a tackifier composed of a polybutene and one or more resins of a type described below, e.g., a tackifier include phenolic resins, coumarone-indene resins, weight proportions of polybutene and such resins. The resins which are incorporated with the polybutenes in the tackifier include phenolic resins, coumarone-indene resins, terpene resins, butadiene-styrene resins, polybutadiene resins, and hydrocarbon resins. It has been found that the novel tackifier of the invention including both the polybutene and one or more of the above resins, when incorporated in an ethylene-propylene rubber, particularly a terpolymer, provides substantially improved tackiness of the uncured rubber and substantially greater adherence of layers of such rubber to each other, as compared to the same ethylene-propylene rubber containing polybutene separately, or the resin component separately, of the tackifier composition hereof. Such improved tackiness of uncured ethylene-propylene rubbers employing the tackifier of the invention is achieved without adversely effecting any of the desirable characteristics of these rubbers.

The polybutene component of the tackifier composition of the invention is generally in liquid form, and preferably ranges in molecular weight from about 300 to about 3,000. The polybutenes are known materials generally produced by catalytic polymerization of butenes derived from a petroleum hydrocarbon source, in the presence of acidic catalysts. The polybutenes are generally soluble in benzene, ethyl ether, petroleum and coal tar distillates, and chlorinated hydrocarbons, and insoluble in ethyl and isopropyl alcohols, acetone and most highly polar solvents. Although not preferred, polybutenes in the form of solids and of higher molecular weight than the corresponding liquids noted above, can also be employed in the tackifier composition of the invention.

The resins which can be employed together with the polybutene in the tackifier composition hereof are liquid, semi-solid to solid, complex amorphous materials generally in the form of mixtures of organic compounds having no definite melting pint and no tendency to crystallize. Such resins are insoluble in water, as distinct from gums, and can be of vegetable or animal origin, or can be synthetic resins. The resins employed are compatible with the polybutene component of the tackifier, and function in combination with such component to provide substantial and improved tackiness of the ethylene-propylene copolymer or terpolymer rubber, superior to the tackiness of such rubber produced by polybutene or such resin component, separately.

One class of resins which can be employed in the tackifier of the invention are the phenolic resins. Preferably resol phenolic resins are employed, that is, those which can be dissolved in a solvent such as ketones, e.g., acetone, and alcohols, e.g., ethyl alcohol. Typical of such resins are the phenol-aldehyde resins including phenol-formaldehyde resins, halogenated, e.g., chlorinated, phenol-formaldehyde resins, with halogen substitution on the aromatic ring or on a substituent, e.g., an alkyl group such as a methyl group, on the aromatic ring, phenol-acetaldehyde resins, phenol-acrolein resins, phenol-furfural resins, and the like. Some commercial resins of this type are the phenol-formaldehyde resins marketed as Amberol ST–137X, Catalin 9986 and Durez 19900, and the brominated phenol-formaldehyde resins marketed as SP–1055.

Another class of resin components which can be employed together with a polybutene in the tackifier composition hereof, are the coumarone-indene resins. Generally the coumarone-indene resins which can be employed have a molecular weight which ranges from about 500 to about 5,000. Examples of resins of this type which are available commercially include those materials marketed as Picco–25 and Picco–100.

Another class of resins which can be employed together with the polybutene component in the tackifier hereof are the terpene resins, including also styrenated terpenes. These terpene resins can have a molecular weight range from about 600 to about 6,000. A typical commercially available resin of this type is marketed as Piccolyte S–100.

A fourth class of resins which can be employed in the tackifier together with the polybutene component are the butadiene-styrene resins having a molecular weight ranging from about 500 to about 5,000. A typical commercial product of this type is marketed as Buton 100, a liquid butadiene-styrene copolymer resin having a molecular weight of about 2,500.

A fifth class of resins which can be employed as resin component in the tackifier hereof are the polybutadiene resins having a molecular weight ranging from about 500 to about 5,000. A commercially available product of this type is that marketed as Buton 150, a liquid polybutadiene resin having a molecular weight of about 2,000 to about 2,500.

A sixth class of resins which can be employed as resin component in the invention tackifier are the so-called hydrocarbon resins produced by catalytic polymerization of selected fractions obtained in the refining of petroleum, and having a molecular weight range of about 500 to about 5,000. Examples of such resin are those marketed as the Piccopale, Amoco and Velsicol resins.

The proportion of polybutene to resin which can be employed in the tackifier composition of the invention can vary depending upon such factors as the degree of tackiness desired, the particular ethylene-propylene copolymer or terpolymer rubber employed. The weight ratio of polybutene to resin component in the tackifier can accordingly range from about 3:1 to about 1:3. An increase in the ratio of resin component to polybutene tends to increase the tackiness of the resulting ethylene-propylene rubber in which the tackifier composition is incorporated. Generally, a larger proportion of resin component as compared to polybutene is employed. The use of approximately equal weight proportions of polybutene and resin components in the tackifier composition hereof has been found particularly desirable.

The tackifier composition of the invention including polybutene and the resin component, can be incorporated in an ethylene-propylene rubber, as described above, which can be in the form either of an elastomeric solid or an oil extended rubber in which the above-described ethylene-propylene copolymer or terpolymer is extended with an oil of paraffinic, naphthenic or aromatic character. The tackifier can be incorporated in the ethylene-propylene copolymer or terpolymer rubber in varying proportions, preferably employing a minor amount of tackifier, which can range from about 2.5 to about 50 parts of the tackifier composition per 100 parts of the rubber, preferably about 10 to about 35 parts of the tackifier to 100 parts of rubber, by weight.

Various conventional additives can be incorporated in the ethylene-propylene rubbers containing the tackifier composition of the invention in preparing the uncured or unvulcanized rubber compound. These include, for example, fillers, pigments, activators, accelerators, cross linking agents or promoters, and plasticizers.

Fillers generally employed in rubber formulations are the carbon blacks. Any well known type of carbon black can be employed for incorporation in the ethylene-propylene rubber formulations of the invention including furnace blacks, thermal blacks and channel blacks. The carbon black filler employed in the ethylene-propylene rubber formulations of the invention including the novel tackifier hereof, improves abrasion resistance, tensile strength and tear resistance of the cured rubber compound. The carbon black can be employed in amounts ranging from about 5 to about 200 parts, preferably about 25 to about 75 parts, per 100 parts of the ethylene-propylene copolymer or terpolymer rubber employed as the base material, by weight.

Pigments are also generally employed in rubber formulations, and such materials can also be incorporated in the ethylene-propylene uncured rubber formulation including the tackifier, of the invention. Such pigments include, for example, metal oxides such as zinc oxide, titanium dioxide, antimony oxide, magnesium oxide, calcium oxide, lead oxide, and other pigments such as calcium carbonate, barium sulfate, zinc sulfide, talc, and the like. Such pigments in addition to functioning to impart color to the cured rubber, also can function as a filler. The above metal oxides further function to activate the cure of the rubber and thus also function as a catalyst. The proportions of such pigments which can be employed can range from about 1 to as high as about 250 parts, preferably about 20 to about 100 parts per 100 parts of the ethylene-propylene copolymer or terpolymer base rubber. Where metal oxides are employed, these materials are generally employed in an amount of about 1 to about 10 parts per 100 parts of the ethylene-propylene rubber, by weight.

Accelerators can also be employed in the rubber formulation of the invention. Such accelerators can include any of the well known types of accelerators such as carbamates, thiazoles, aldehyde-amines, sulfenamides, and thiuram sulfides, e.g., the monosulfide, disulfide or tetrasulfide. Preferred materials are the dithiocarbamates, such as zinc dimethyl dithiocarbamate, and the thiuram disulfides, e.g., tetramethyl thiuram disulfide. The proportions of such accelerators which can be employed range from about 0.5 to about 5, preferably about 1 to about 3 parts per 100 parts of the base ethylene-propylene rubber, by weight.

Cross linking systems for curing the ethylene-propylene rubber include in addition to the above-noted accelerators, a cross linking agent. Thus, for example, sulfur is a well known cross linking agent or vulcanizer for this purpose. However, in place of sulfur there can be employed as cross linking agent a peroxide such as benzoyl peroxide, di-tertiary butyl peroxide, dicumyl peroxide, and the like; polyalkylene polyamines, such as ethylene diamine and triethylene tetraamine, dibenzo substituted dioximes such as quinone dioxime, and the like. Combinations of such cross linking agents also can be employed. Where the ethylene-propylene copolymer is employed, which is an essentially saturated rubber, the above-noted organic cross linking agents preferably are employed. Where the ethylene-propylene terpolymer rubber is employed, and which has some degree of unsaturation, either sulfur or an organic cross linking agent of the above-noted types or a combination thereof can be employed. The proportion of cross linking agent utilized can range from about 0.25 to about 5 parts, preferably about 1 to about 3 parts, per 100 parts of the ethylene-propylene rubber, by weight.

If desired, plasticizers also can be incorporated in the rubber formulation of the invention. Such plasticizers include, for example, polyethers such as the glycol polyethers, polyesters such as the dialkyl phthalates, e.g., dibutyl or dioctyl phthalate, and phosphate esters such as tricresyl phosphate and dibutyl phenyl phosphate. The proportions of such plasticizers which can be employed can range from about 1 to about 20 parts per 100 parts of the ethylene-propylene rubber, by weight.

The tackifier of the invention including the polybutene and the resin described above, can be incorporated into the ethylene-propylene copolymer or terpolymer rubber, or rubber formulation including any one or more of the optional additives noted above, in any suitable manner. Thus, for example, the specific ethylene-propylene rubber employed can be placed on a rubber mill to break the rubber down. Then pigment and carbon black can be added and the resulting mixture blended thoroughly on the mill. Then the invention tackifier including the polybutene and resin component can be blended into the mixture on the mill. Following this, the cross linking system including accelerator and cross-linking agent can be incorporated and the entire mixture thoroughly blended on the mill, providing an uncured rubber formulation according to the invention which has improved tackiness and which is particularly valuable in the manufacture of tires. During such blending on the rubber mill, no heat is applied and cooling water is circulated in the rolls of the mill, so as to prevent any premature curing of the rubber before it is employed in the desired application.

In order to vulcanize or cure the above-noted formulation in the manufacture of a part such as a rubber tire, the tire, for example, containing the adherent layers of uncured rubber compound according to the invention, is placed in a mold of a press and the part is molded under high pressure, e.g., of the order of 150 pounds per square inch, with the application of heat at temperatures, e.g., of the order of about 300° to about 325° F., to provide the proper cure.

The following are examples of practice of the invention. In tests carried out employing the rubber formulations of the examples below, in the general procedure followed, a sheet of uncured rubber according to the formulations of the examples below is folded over on itself and a weight is placed thereon for a period of about 5 minutes. After this period the weight is removed and the two layers are pulled apart. The relative adhesion between such adjacent layers of rubber employing different tackifiers of the various rubber formulations is determined by the amount of force necessary to pull the layers apart.

In each of the examples below the proportions of components are given in terms of parts by weight unless otherwise indicated.

EXAMPLE 1

The following uncured rubber formulation shown as composition A below is prepared:

Composition A

| | Parts |
|---|---|
| Ethylene-propylene terpolymer rubber | 100.0 |
| Zinc oxide | 5.0 |
| Furnace black | 40.0 |
| Polybutene | 10.0 |
| Phenol-formaldehyde resin | 10.0 |
| Zinc dimethyl dithiocarbamate | 2.0 |
| Tetramethyl thiuram disulfide | 1.0 |
| Sulfur | 1.5 |

The ethylene-propylene terpolymer rubber of composition A is a material marketed as Royalene 301X and is understood to be a terpolymer containing about 40 to about 50 mole percent ethylene, about 60 to about 50 mole percent propylene, and about 0.1 to about 1.0 mole of nonconjugated cyclic diene per kilogram of copolymer. The furnace black employed in the above composition is marketed as FEF Furnace Black, the polybutene of composition A is a product marketed as Polybutene No. 128, which is in liquid form and having a molecular weight of about 2,000 to about 3,000. The phenol-formaldehyde resin of the above composition is a resol phenol-formaldehyde marketed as Amberol ST–137X, the dithiocarbamate employed is marketed as Methyl Zimate, and the thiuram disulfide component of the above compositions is marketed as Methyl Tuads.

The same formulation as composition A above is prepared except that in place of the 10 parts of polybutene and 10 parts phenol-formaldehyde resin forming the tackifier composition according to the invention, 20 parts of each of the respective materials noted below is employed in a series of compositions indicated as numbers 1 to 9 below:

Compositions 1 to 9 each containing 20 parts respectively of:

(1) Polybutene #128
(2) Coumarone-indene resin (Picco 25)
(3) Phenol-formaldehyde resin (Amberol ST–137X)
(4) Coumarone-indene resin (Picco 100)
(5) Butadiene-styrene resin (Buton 100)

(6) Polybutadiene resin (Buton 150)
(7) Terpene resin (Piccolyte 1–100)
(8) Hydrocarbon resin (Velsicol resin)
(9) p-Tert. butyl phenol-acetylene condensation product (Koresin)

In tackiness tests performed according to the procedure described above employing the uncured ethylene-propylene-terpolymer rubber composition A of the invention, and the same compositions but employing in place of the tackifier composition of A including the polybutene and resin component, the respective materials 1 to 9 above, composition A possesses substantially greater tack as compared to any of the formulations 1 to 9 above, containing either polybutene alone as in formulation 1 above, or one of the types of resin components employed in the invention tackifier (formulations 2 to 8) or the resin formulation 9, but in the absence of polybutene.

The polybutene of composition D is a liquid polybutene having a molecular weight of about 900. The ethylene-propylene copolymer rubber of composition D is a rubber containing 60 mole percent ethylene and 40 mole percent propylene, and having an average molecular weight of about 250,000 to about 300,000.

Tackiness and adherence tests carried out by procedure described above employing the uncured rubber composition D above shows enhanced tackiness of composition D as compared to any one of compositions 1 to 9 of Example 1 above, and comparable to the tackiness of the invention compositions A, B and C of Examples 1 and 2 above.

EXAMPLE 4

In the table below is listed a series of various uncured ethylene-propylene rubber compositions further illustrating the invention.

| Components | E | F | G | H | I | J | K | L | M | N | O |
|---|---|---|---|---|---|---|---|---|---|---|---|
| Ethylene-propylene-diene terpolymer | 100 | 100 | 100 | 100 | 100 | 100 | 100 | | | 100 | 100 |
| Ethylene-propylene copolymer | | | | | | | | 100 | 100 | | |
| Zinc oxide | 5 | 5 | 5 | 5 | 5 | 5 | 5 | 5 | 5 | 5 | 5 |
| Fast extruding furnace black | 50 | | | 25 | | 50 | 50 | 50 | | 50 | |
| High abrasion furnace black | | 50 | | 25 | | | | | 25 | | 50 |
| Medium thermal black | | | 100 | | 100 | | 30 | | 25 | | 25 |
| Hard clay | | | | | 100 | | | | 25 | | |
| 2-mercaptobenzothiazole | | 0.5 | 0.5 | | | | | | | | |
| 2-benzothiazyl disulfide | 0.5 | | | 0.5 | 0.5 | | 0.5 | | | 0.5 | 0.5 |
| Tetramethyl thiuram disulfide | 1.0 | 1.5 | 1.5 | 1.0 | 1.0 | | 1.0 | | | 1.0 | 1.0 |
| Zinc dimethyl dithiocarbamate | 2.0 | | | 2.0 | 2.0 | | 2.0 | | | 2.0 | 2.0 |
| p-Quinone dioxime | | | | | | 0.5 | | 1.0 | 1.0 | | |
| Sulfur | 1.25 | 1.5 | 1.5 | 1.5 | 1.5 | | 1.5 | 0.32 | 0.32 | 1.5 | 1.5 |
| Dicumyl peroxide | | | | | | 1.0 | | 2.85 | | | |
| Di-tert. butyl peroxide | | | | | | | | | 3.0 | | |
| Polybutene | 10 | 6.7 | 5 | 6.7 | 20 | 13.3 | 10 | 5 | 10 | 6.7 | 20 |
| Phenol-formaldehyde resin | 10 | 13.3 | | | | | 20 | | | | |
| Straight chain hydrocarbon resin | | | 15 | | | | | | | | |
| Coumarone-indene resin | | | | 13.3 | 20 | | | | | | |
| Terpene resin | | | | | | 6.7 | | | | | |
| Butadiene-styrene resin | | | | | | | | 5 | | | |
| Polybutadiene resin | | | | | | | | | 5 | | |
| Glycerol ester of hydrogenated rosin (a terpene resin) | | | | | | | | | | 13.3 | |
| Wood rosin (a terpene resin) | | | | | | | | | | | 10 |

It is apparent from these tests that the tackifier components of the invention including the polybutene in combination with the above-described resin component, function in a synergistic manner to produce the highly improved tackiness of the uncured ethylene-propylene rubber compounds of the invention.

EXAMPLE 2

Rubber formulations the same as composition A above are prepared, indicated as compositions B and C, differing from composition A above only in that the phenol-formaldehyde component is replaced by 10 parts of coumarone-indene resin (Picco–25) in composition B, and by 10 parts of terpene resin (Piccolyte S–100) in composition C.

Tackiness or adhesion tests carried out as described above for compositions A, B and C, show substantial tackiness and adhesion for all three uncured rubber formulations, with composition A being somewhat superior to composition B, and composition B being somewhat superior to composition C.

EXAMPLE 3

The following formulation, composition D according to the invention, is prepared:

Composition D

| | Parts |
|---|---|
| Ethylene-propylene copolymer rubber | 100.0 |
| Carbon black | 100.0 |
| Zinc oxide | 5.0 |
| Polybutene | 10.0 |
| Butadiene-styrene resin (Buton 100) | 5.0 |
| p-Quinone dioxime | 1.0 |
| N, 4-dinitroso-N-methylaniline | 1.0 |
| Polyether plasticizer | 2.5 |
| Di-tertiary butyl peroxide | 2.5 |

From the foregoing, it is seen that the invention provides relatively inexpensive uncured ethylene-propylene rubber formulations containing an improved tackifier composed of two essential ingredients, namely, a polybutene, and certain resins, such tackifier rendering such rubber formulations substantially more tacky than prior art uncured ethylene-propylene rubber formulations, the improved ethylene-propylene rubber formulations of the invention being particularly valuable in the manufacture of tires.

While we have described particular embodiments of our invention for the purpose of illustration, it should be understood that various modifications and adaptations thereof may be made within the spirit of the invention within the scope of the appended claims.

We claim:

1. An uncured rubber composition containing an ethylene-propylene rubber containing about 40 to about 60 mole percent ethylene and about 60 to about 40 mole percent propylene, and a tackifier sufficient to impart substantial tackiness to the rubber, said tackifier consisting essentially of a polybutene having a molecular weight range from about 300 to about 3,000 and a resin in the form of a liquid, semi-solid to solid, complex amorphous material insoluble in water and compatible with said polybutene, said resin being selected from the group consisting of resol phenolaldehyde resins, coumarone-indene resins having a molecular weight range from about 500 to about 5,000, terpene resins having a molecular weight range from about 600 to about 6,000, butadiene-styrene resins having a molecular weight range from about 500 to about 5,000, polybutadiene resins having a molecular weight range from about 500 to about 5,000, and hydrocarbon resins produced by catalytic polymerization of petroleum fractions and having a molecular weight range from about 500 to about 5,000, the weight ratio of polybutene to resin in said tackifier being in the range from about 3:1 to about 1:3, and employing about 2.5 to about 50 parts of said tackifier per 100 parts by weight of said ethylenepropylene rubber.

2. The rubber composition as defined in claim 1, wherein said resin is a resol phenol-aldehyde resin.

3. The rubber composition as defined in claim 1, wherein said ethylene-propylene rubber is an ethylene-propylene-diene terpolymer rubber, said terpolymer containing about 0.1 to about 1.0 mole of diene monomer per kilogram of copolymer.

4. The rubber composition as defined in claim 1, wherein said ethylene-propylene rubber is an ethylene-propylene copolymer rubber.

5. The rubber composition as defined in claim 3, employing about 10 to about 35 parts of said tackifier per 100 parts by weight of said rubber.

6. The rubber composition as defined in claim 3, wherein said resin is a resol phenol-aldehyde resin.

7. The rubber composition as defined in claim 4, employing about 10 to about 35 parts of said tackifier per 100 parts by weight of said rubber.

8. The rubber composition as defined in claim 1, wherein said polybutene is a normally liquid polybutene, and including about 5 to about 200 parts of a carbon black, about 1 to about 250 parts of a pigment, about 0.5 to about 5 parts of an accelerator, and about 0.25 to about 5 parts of a cross linking agent.

9. The rubber composition as defined in claim 3, wherein said resin is a resol phenol-formaldehyde resin.

10. The rubber composition as defined in claim 3, wherein said resin is said coumarone-indene resin.

11. The rubber composition as defined in claim 3, wherein said resin is said terpene resin.

12. The rubber composition as defined in claim 3, wherein said resin is said butadiene-styrene resin.

13. The rubber composition as defined in claim 3, wherein said resin is said polybutadiene resin.

14. The rubber composition as defined in claim 3, wherein said resin is said hydrocarbon resin.

15. The rubber composition as defined in claim 3, employing about equal weight proportions of said polybutene and said resin.

16. The rubber composition defined in claim 3, wherein said resin is a resol phenol-formaldehyde resin, said tackifier is employed in an amount of about 10 to about 35 parts per 100 parts of said rubber, and said tackifier consists essentially of about equal parts by weight of said polybutene and said resin.

17. In the method of fabrication of a rubber article wherein at least two layers of material are brought into physical contact, said material containing uncured rubber compound, and the two layers are pressed together and are bonded to one another by curing of the rubber component, the improvement which comprises employing an ethylene-propylene rubber as the rubber component of said material, said ethylene-propylene rubber containing a tackifier to impart substantial tackiness to the rubber, said tackifier consisting essentially of a polybutene having a molecular weight range from about 300 to about 3,000 and a resin in form of a liquid, semi-solid to solid, complex amorphous material insoluble in water and compatible with said polybutene, said resin being selected from the group consisting of resol phenolaldehyde resins, coumarone-indene resins having a molecular weight range from about 500 to about 5,000, terpene resins having a molecular weight range from about 600 to about 6,000, butadiene-styrene resins having a molecular weight range from about 500 to about 5,000, polybutadiene resins having a molecular weight range from about 500 to about 5,000, and hydrocarbon resins produced by catalytic polymerization of petroleum fractions and having a molecular weight range from about 500 to about 5,000, the weight ratio of polybutene to resin in said tackifier being in the range from about 3:1 to about 1:3, and employing about 2.5 to about 50 parts of said tackifier per 100 parts by weight of said ethylene-propylene rubber.

18. The method as defined in claim 17, wherein said rubber article is a tire.

References Cited

UNITED STATES PATENTS

| | | | |
|---|---|---|---|
| 3,043,787 | 7/1962 | Bonvicini et al. | 260—4 |
| 3,084,089 | 4/1963 | Morgan et al. | 156—181 |

OTHER REFERENCES

L. O. Amberg et al.: Rubber World, vol. 147, No. 6, March 1963, "The Hercules EPT," pages 52–59 relied on.

India Rubber World, "Compounding Ingredients for Rubber," 2nd edition, N.Y., 1947, (pages 271 and 277 relied on).

I. Skeist: "Handbook of Adhesives," N.Y., 1962, Reinbold Publishing Co. (pages 196–202; 218–219; 228 relied on).

ALLAN LIEBERMAN, Primary Examiner

U.S. Cl. X.R.

152—330; 260—298, 33.6, 41, 41.5, 829, 846, 848, 888, 889, 896, 897

UNITED STATES PATENT OFFICE
CERTIFICATE OF CORRECTION

Patent No. 3,514,417                                                      May 26, 1970

Frederic W. Bickel et al.

It is certified that error appears in the above identified patent and that said Letters Patent are hereby corrected as shown below:

Column 3, line 5, cancel "include phenolic resins, coumarone-indene resins," and insert -- composition containing approximately equal --; line 41, cancel "pint" and insert -- point --. Column 7, line 2, cancel "1-100" and insert -- S-100 --.

Signed and sealed this 13th day of October 1970.

(SEAL)
Attest:

Edward M. Fletcher, Jr.                                WILLIAM E. SCHUYLER, JR.
Attesting Officer                                               Commissioner of Patents